United States Patent
Phuyal et al.

(10) Patent No.: US 11,096,244 B2
(45) Date of Patent: Aug. 17, 2021

(54) SYSTEMS, METHODS AND DEVICES FOR NON-ADAPTIVE RETRANSMISSION USING SEMI-PERSISTENT SCHEDULING RESOURCES

(71) Applicant: APPLE INC., Cupertino, CA (US)

(72) Inventors: Umesh Phuyal, Beaverton, OR (US); Yujian Zhang, Beijing (CN); Youn Hyoung Heo, Seoul (KR)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/093,093

(22) PCT Filed: Dec. 22, 2016

(86) PCT No.: PCT/US2016/068232
§ 371 (c)(1),
(2) Date: Oct. 11, 2018

(87) PCT Pub. No.: WO2017/196400
PCT Pub. Date: Nov. 16, 2017

(65) Prior Publication Data
US 2019/0215907 A1    Jul. 11, 2019

Related U.S. Application Data

(60) Provisional application No. 62/335,178, filed on May 12, 2016.

(51) Int. Cl.
*H04L 1/00* (2006.01)
*H04L 1/18* (2006.01)
(Continued)

(52) U.S. Cl.
CPC .......... *H04W 88/06* (2013.01); *H04L 1/0003* (2013.01); *H04L 1/1819* (2013.01);
(Continued)

(58) Field of Classification Search
CPC ... H04L 1/0003; H04L 1/1819; H04L 1/1864; H04L 1/1887; H04L 5/0055;
(Continued)

(56) References Cited

U.S. PATENT DOCUMENTS 8,160,014 B2 * 4/2012 Ojala .................... H04L 1/1887
370/329
8,370,695 B2 * 2/2013 Hsu ......................... H04L 1/189
714/748

(Continued)

FOREIGN PATENT DOCUMENTS

CN    102171963 A    8/2011
CN    103348620 A    10/2013
(Continued)

OTHER PUBLICATIONS

PCT/US2016/068232, International Search Report and Written Opinion, dated Mar. 31, 2017, 13 pages.
(Continued)

*Primary Examiner* — Alpus Hsu
(74) *Attorney, Agent, or Firm* — Stoel Rives LLP

(57) ABSTRACT

Techniques, apparatus and methods are disclosed that enable non-adaptive Hybrid Automatic Repeat Request (HARQ) retransmission using SPS resources. Non-adaptive HARQ retransmission can be enabled in a configured Uplink (UL) resource (such as SPS resources). As it may not be beneficial to allow non-adaptive HARQ retransmission on SPS resources for all kinds of traffic, options for proper configuration can be provided either by network signaling or by predefined configurations. For example, embodiments are described to enable non-adaptive retransmission using SPS resources: Always allow non-adaptive retransmission on configured UL grants; Allow non-adaptive retransmission on configured UL grants only for certain predefined conditions; Allow non-adaptive HARQ retransmissions when there is no (Continued)

data in the UL buffer for new transmission; Enable non-adaptive retransmissions using a configurable boolean parameter; Enable non-adaptive retransmissions using a configurable threshold parameter; and Enable non-adaptive retransmissions using a configuration sent using a system information broadcast.

19 Claims, 14 Drawing Sheets

(51) Int. Cl.
*H04L 5/00* (2006.01)
*H04W 72/04* (2009.01)
*H04W 72/14* (2009.01)
*H04W 76/27* (2018.01)
*H04W 80/02* (2009.01)
*H04W 88/06* (2009.01)

(52) U.S. Cl.
CPC .......... *H04L 1/1864* (2013.01); *H04L 1/1887* (2013.01); *H04L 5/0055* (2013.01); *H04L 5/0082* (2013.01); *H04W 72/0446* (2013.01); *H04W 72/14* (2013.01); *H04W 76/27* (2018.02); *H04W 80/02* (2013.01)

(58) Field of Classification Search
CPC ............ H04L 5/0082; H04W 72/0446; H04W 72/14; H04W 76/27; H04W 80/02; H04W 88/06
See application file for complete search history.

(56) References Cited

U.S. PATENT DOCUMENTS

| | | | | |
|---|---|---|---|---|
| 8,943,378 B2* | 1/2015 | Wang | ................... | H04L 1/1812 714/749 |
| 8,966,333 B2* | 2/2015 | Sagfors | ................. | H04L 1/1819 714/748 |
| 9,059,849 B2* | 6/2015 | Li | .......... | H04L 1/1822 |
| 9,100,179 B2* | 8/2015 | Ho | .......... | H04L 1/1812 |
| 9,172,509 B2* | 10/2015 | Zhang | ................... | H04L 1/1621 |
| 9,197,376 B2* | 11/2015 | Verma | ................... | H04L 1/1812 |
| 9,270,409 B2* | 2/2016 | Earnshaw | ............ | H04L 1/0003 |
| 9,408,144 B2* | 8/2016 | Tabet | ................ | H04W 52/0216 |
| 9,425,928 B2* | 8/2016 | Guan | ..................... | H04B 1/713 |
| 9,444,586 B2* | 9/2016 | Vajapeyam | ........... | H04L 1/1822 |
| 9,706,567 B2* | 7/2017 | Yang | .................... | H04L 5/0092 |
| 9,762,356 B2* | 9/2017 | Rudolf | .............. | H04W 72/0446 |
| 9,826,523 B2* | 11/2017 | Chen | ................... | H04L 1/1812 |
| 2011/0256879 A1* | 10/2011 | Chun | .................. | H04L 1/1877 455/450 |
| 2015/0098371 A1* | 4/2015 | Vajapeyam | ........... | H04L 1/1861 370/280 |
| 2015/0109972 A1* | 4/2015 | Khoryaev | ........... | H04L 65/1069 370/280 |
| 2015/0124671 A1 | 5/2015 | Tabet et al. | | |
| 2017/0094676 A1* | 3/2017 | Kim | ................. | H04W 72/1205 |

FOREIGN PATENT DOCUMENTS

| | | |
|---|---|---|
| CN | 104604314 A | 5/2015 |
| CN | 105580445 A | 5/2016 |
| EP | 2166804 A1 | 3/2010 |
| EP | 2615763 A2 | 7/2013 |
| WO | 2015111891 A1 | 7/2015 |

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 13)", V13.1.0, Mar. 2016, 85 pages.

* cited by examiner

```
MAC-MainConfig ::=                  SEQUENCE {
    ul-SCH-Config                       SEQUENCE {
        maxHARQ-Tx                          ENUMERATED {
                                                n1, n2, n3, n4, n5, n6, n7, n8,
                                                n10, n12, n16, n20, n24, n28,
                                                spare2, spare1}    OPTIONAL, -- Need ON
        periodicBSR-Timer                   PeriodicBSR-Timer-r12    OPTIONAL, -- Need ON
        retxBSR-Timer                       RetxBSR-Timer-r12,
        ttiBundling                         BOOLEAN
                                                                    OPTIONAL, -- Need ON
    }
    drx-Config                          DRX-Config                   OPTIONAL, -- Need ON
    timeAlignmentTimerDedicated         TimeAlignmentTimer,
    phr-Config                          CHOICE {
        release                             NULL,
        setup                               SEQUENCE {
            periodicPHR-Timer                   ENUMERATED {sf10, sf20, sf50, sf100, sf200,
                                                            sf500, sf1000, infinity},
            prohibitPHR-Timer                   ENUMERATED {sf0, sf10, sf20, sf50, sf100,
                                                            sf200, sf500, sf1000},
            dl-PathlossChange                   ENUMERATED {dB1, dB3, dB6, infinity}
        }
    }                                                                OPTIONAL, -- Need ON
    ...,
[[  sr-ProhibitTimer-r9                 INTEGER (0..7)       OPTIONAL, -- Need ON
]],
[[  mac-MainConfig-v1020                SEQUENCE {
        sCellDeactivationTimer-r10          ENUMERATED {
                                                rf2, rf4, rf8, rf16, rf32, rf64, rf128,
                                                spare}       OPTIONAL, -- Need OP
        extendedBSR-Sizes-r10               ENUMERATED {setup}       OPTIONAL, -- Need
OR
        extendedPHR-r10                     ENUMERATED {setup}       OPTIONAL --
Need OR
    }                                                                OPTIONAL, -- Need ON
]],
[[  stag-ToReleaseList-r11              STAG-ToReleaseList-r11  OPTIONAL, -- Need ON
    stag-ToAddModList-r11               STAG-ToAddModList-r11   OPTIONAL, -- Need ON
    drx-Config-v1130                    DRX-Config-v1130        OPTIONAL  -- Need ON
]],
[[  e-HARQ-Pattern-r12                  BOOLEAN                      OPTIONAL, -- Need ON
    dualConnectivityPHR                 CHOICE {
        release                             NULL,
        setup                               SEQUENCE {
            phr-ModeOtherCG-r12                 ENUMERATED {real, virtual}
        }
    }                                                                OPTIONAL, -- Need ON
```

CONTINUED IN 3B        FIG. 3A    Data of an information element for a MAC configuration

```
        logicalChannelSR-Config-r12      CHOICE {
            release                      NULL,
            setup                        SEQUENCE {
                logicalChannelSR-ProhibitTimer-r12    ENUMERATED {sf20, sf40, sf64, sf128,
sf512, sf1024, sf2560, spare1}
            }
        }                                                       OPTIONAL    -- Need ON
    ]],
    [[  drx-Config-v1310              DRX-Config-v1310    OPTIONAL,    -- Need ON
        extendedPHR2-r13              BOOLEAN             OPTIONAL,    -- Need ON
        eDRX-Config-CycleStartOffset-r13 CHOICE {
            release                   NULL,
            setup
                                      CHOICE {
                sf5120                        INTEGER(0..1),
                sf10240                       INTEGER(0..3)
            }
        }                             OPTIONAL  -- Need ON
    ]],
    [[  drx-Config-r13                CHOICE {
            release                   NULL,
            setup                     DRX-Config-r13
        }                                                       OPTIONAL  -- Need ON
    ]],
    [[  nonAdaptiveRetransOnPreschedGrant-vXXYY    BOOLEAN    OPTIONAL    -- Need
ON
    ]]
}
```

Data of an information element for a
MAC configuration

CONTINUED FROM 3A

FIG. 3B

```
-- ASN1START

LogicalChannelConfig ::=          SEQUENCE {
    ul-SpecificParameters         SEQUENCE {
        priority                  INTEGER (1..16),
        prioritisedBitRate        ENUMERATED {
                                      kBps0, kBps8, kBps16, kBps32, kBps64, kBps128,
                                      kBps256, infinity, kBps512-v1020, kBps1024-v1020,
                                      kBps2048-v1020, spare5, spare4, spare3, spare2,
                                      spare1},
        bucketSizeDuration        ENUMERATED {
                                      ms50, ms100, ms150, ms300, ms500, ms1000, spare2,
                                      spare1},
        logicalChannelGroup       INTEGER (0..3)       OPTIONAL      -- Need OR
    }   OPTIONAL,                                                    -- Cond UL
    ...,
    [[  logicalChannelSR-Mask-r9          ENUMERATED {setup}   OPTIONAL   -- Cond SRmask
    ]],
    [[  logicalChannelSR-Prohibit-r12     BOOLEAN              OPTIONAL   -- Need ON
    ]],
    [[  nonAdaptiveRetransOnPreschedGrant-vXXYY    BOOLEAN    OPTIONAL    -- Need ON
    ]]
}

-- ASN1STOP
```

Data of an information element for an
LCG configuration

FIG. 4

```
DRB-ToAddMod ::=   SEQUENCE {
    eps-BearerIdentity            INTEGER (0..15)         OPTIONAL,     -- Cond DRB-Setupo
    drb-Identity                  DRB-Identity,
    pdcp-Config                      PDCP-Config          OPTIONAL,     -- Cond PDCP
    rlc-Config                    RLC-Config              OPTIONAL,     -- Cond SetupM
    logicalChannelIdentity        INTEGER (3..10)         OPTIONAL,     -- Cond DRB-SetupM
    logicalChannelConfig          LogicalChannelConfig    OPTIONAL,     -- Cond SetupM
    ...,
    [[  drb-TypeChange-r12              ENUMERATED {toMCG}    OPTIONAL,   -- Need OP
        rlc-Config-v1250             RLC-Config-v1250       OPTIONAL     -- Need ON
    ]],
    [[  rlc-Config-v1310             RLC-Config-v1310       OPTIONAL,    -- Need ON
        drb-TypeLWA-r13                      BOOLEAN                   OPTIONAL,    -- Need ON
        drb-TypeLWIP-r13             ENUMERATED {lwip, lwip-DL-only,
                                     lwip-UL-only, lte}    OPTIONAL     -- Need ON
    ]],
    [[  nonAdaptiveRetransOnPreschedGrant-vXXYY    BOOLEAN    OPTIONAL    -- Need ON
    ]]
}
```

Data of an information element for a
DRB configuration

FIG. 5

```
SPS-ConfigUL ::=    CHOICE {
    release                     NULL,
    setup                       SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }   OPTIONAL,                                           -- Need OP
        twoIntervalsConfig              ENUMERATED {true}       OPTIONAL,  -- Cond TDD
        ...,
        [[  p0-PersistentSubframeSet2-r12      CHOICE {
                release                     NULL,
                setup                       SEQUENCE {
                    p0-NominalPUSCH-PersistentSubframeSet2-r12      INTEGER (-126..24),
                    p0-UE-PUSCH-PersistentSubframeSet2-r12          INTEGER (-8..7)
                }
            }                                                   OPTIONAL  -- Need ON
        ]],
        [[  nonAdaptiveRetrans-vXXYY        BOOLEAN   OPTIONAL      -- Need ON
        ]]
    }
}
```

Data of an information element for an
SPS configuration

FIG. 6

```
SPS-ConfigUL ::=     CHOICE {
    release                         NULL,
    setup                           SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }       OPTIONAL,                                               -- Need OP
        twoIntervalsConfig              ENUMERATED {true}       OPTIONAL, -- Cond TDD
        ...,
        [[  p0-PersistentSubframeSet2-r12       CHOICE {
                release                         NULL,
                setup                           SEQUENCE {
                    p0-NominalPUSCH-PersistentSubframeSet2-r12      INTEGER (-126..24),
                    p0-UE-PUSCH-PersistentSubframeSet2-r12          INTEGER (-8..7)
                }
            }                                                       OPTIONAL  -- Need ON
        ]],
        [[  nonAdaptiveRetransIntervalThr-vXXYY     ENUMERATED {
                                            sf20, sf10, sf5, sf4, sf3, sf2,
                                            sf1, spare1},       OPTIONAL  -- Need ON
        ]]
    }
}
```

Data of an information element for an
SPS configuration

FIG. 7

SYSTEMS, METHODS AND DEVICES FOR NON-ADAPTIVE RETRANSMISSION USING SEMI-PERSISTENT SCHEDULING RESOURCES

RELATED APPLICATION

This application is a national stage filing under U.S.C. § 371 of International Patent Application No. PCT/US2016/068232, filed Dec. 22, 2016, which claims the benefit under 35 U.S.C. § 119(e) of U.S. Provisional Application No. 62/335,178 filed May 12, 2016, each of which is incorporated by reference herein in its entirety.

TECHNICAL FIELD

The present disclosure relates to cellular communication and more specifically to non-adaptive HARQ retransmission using semi-persistent scheduling (SPS) resources.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node (e.g., 5G eNB or gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN 104 implements GSM and/or EDGE RAT, the UTRAN 106 implements universal mobile telecommunication system (UMTS) RAT or other 3GPP RAT, and the E-UTRAN 108 implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

BRIEF DESCRIPTION OF THE DRAWINGS

FIGS. 3A and 3B illustrate data of an information element for a medium access control (MAC) configuration provided by radio resource control (RRC) signaling consistent with embodiments disclosed herein.

FIG. 4 illustrates data for an information element for a logical channel group (LCG) configuration consistent with embodiments disclosed herein.

FIG. 5 illustrates data for an information element for a data radio bearer (DRB) configuration consistent with embodiments disclosed herein.

FIG. 6 illustrates data for an information element for a semi-persistent scheduling (SPS) configuration with a boolean parameter for non-adaptive retransmission consistent with embodiments disclosed herein.

FIG. 7 illustrates data for an information element for a SPS configuration with a threshold parameter for non-adaptive retransmission consistent with embodiments disclosed herein.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable non-adaptive Hybrid Automatic Repeat Request (HARQ) retransmission using SPS resources. Non-adaptive HARQ retransmission can be enabled in a configured Uplink (UL) resource (such as SPS resources). As it may not be beneficial to allow non-adaptive HARQ retransmission on SPS resources for all kind of traffic, options for proper configuration can be provided either by network signaling or by predefined configurations.

For example, six potential embodiments are described to enable non-adaptive retransmission using SPS resources: (1) Always allow non-adaptive retransmission on configured UL grants; (2) Allow non-adaptive retransmission on configured UL grants only for certain predefined conditions; (3) Allow non-adaptive HARQ retransmissions when there is no data in the UL buffer for new transmission; (4) Enable non-adaptive retransmissions using a configurable boolean parameter; (5) Enable non-adaptive retransmissions using a configurable threshold parameter; and (6) Enable non-adaptive retransmissions using a configuration sent using a system information broadcast.

These systems and methods can be used in conjunction with and/or enable a short SPS period to allow UL prescheduling and a reduction of padding in case of dynamic and SPS based UL pre-scheduling to reduce interference and UE power consumption. For example, retransmission of transmission 102 is ignored (i.e., retransmission 106 is not carried out). Transmission 108 is a new transmission and its retransmission 110 happens (instead of another new transmission 112).

These systems can enable very frequent SPS resources in the UL (e.g., less than 10 or 20 TTI) and enable the UE to ignore (i.e., skip the UL grant) such that no UL transmission happens on a physical uplink shared channel (PUSCH) if a user equipment (UE) has no data to transmit in the UL. This is different from UE behavior captured in the Rel. 13 3GPP specification where a padding protocol data unit (PDU) would be transmitted by the UE. Note that some of the disclosed solutions are not specific to latency reduction but can be applicable to SPS UL communication with or without UL grant skipping (reduction of padding) enabled.

Figure 1:
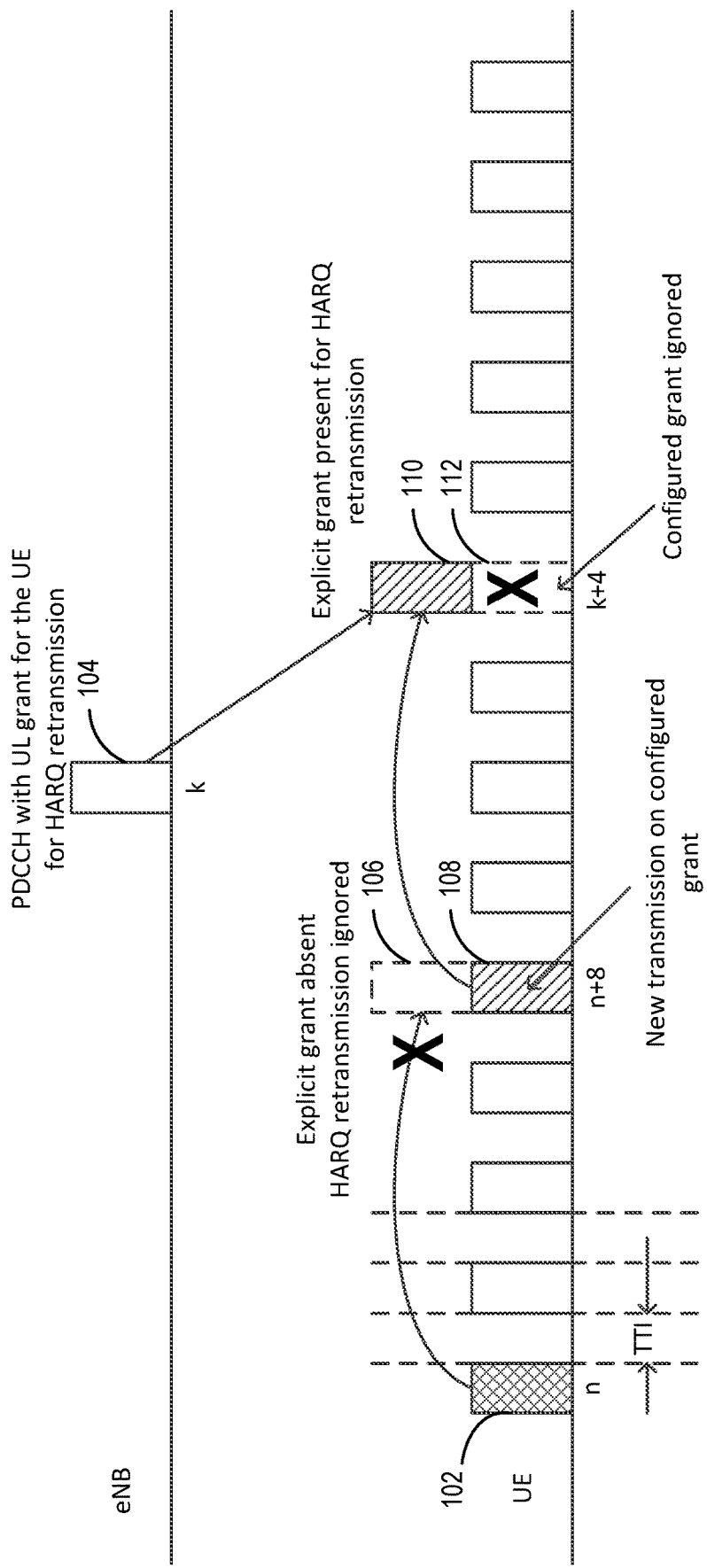
FIG. 1 is a diagram illustrating a configured UL grant used for a new transmission in absence of an explicit grant for adaptive hybrid automatic repeat request (HARM) retransmission in frequency division duplex (FDD) consistent with embodiments disclosed herein.

FIG. 1 is a diagram illustrating a configured UL grant used for a new transmission 108 in absence of an explicit grant 104 for hybrid automatic repeat request (HARQ) retransmission 110 in frequency division duplex (FDD). In the embodiment, an SPS periodicity of 2 TTI is shown. The figure also shows that adaptive HARQ retransmission is performed when the explicit grant 104 is present for the corresponding TTI.

According to certain solutions, HARQ retransmissions of UL data 108 sent on SPS-configured resources are done using adaptive retransmissions 110 on UL resource grants 104 explicitly signaled using PDCCH (see, e.g., section 5.4 in Rel. 13 3GPP TS 36.321, MAC Protocol Specification). In such solutions, unless an explicit grant 104 on PDCCH is received, a configured grant causes the new data indicator (NDI) bit for the corresponding HARQ process to be toggled, which in turn triggers a new transmission 108 instead of HARQ retransmission 106 even though a HARQ buffer for the HARQ process is not empty. Therefore, retransmission of UL data 102 is ignored in the shown example. If there is a preconfigured grant in that TTI, for example for a short SPS interval (e.g., 1 TTI, 2 TTI, 4 TTI, 8 TTI, 10 TTI, etc.) for FDD, this resource cannot by itself be used for HARQ retransmissions 106 without explicit signaling. In such case, as HARQ retransmissions on SPS resources 106, 110 use explicit signaling by the physical downlink control channel (PDCCH), this can significantly increase PDCCH load.

Figure 2:
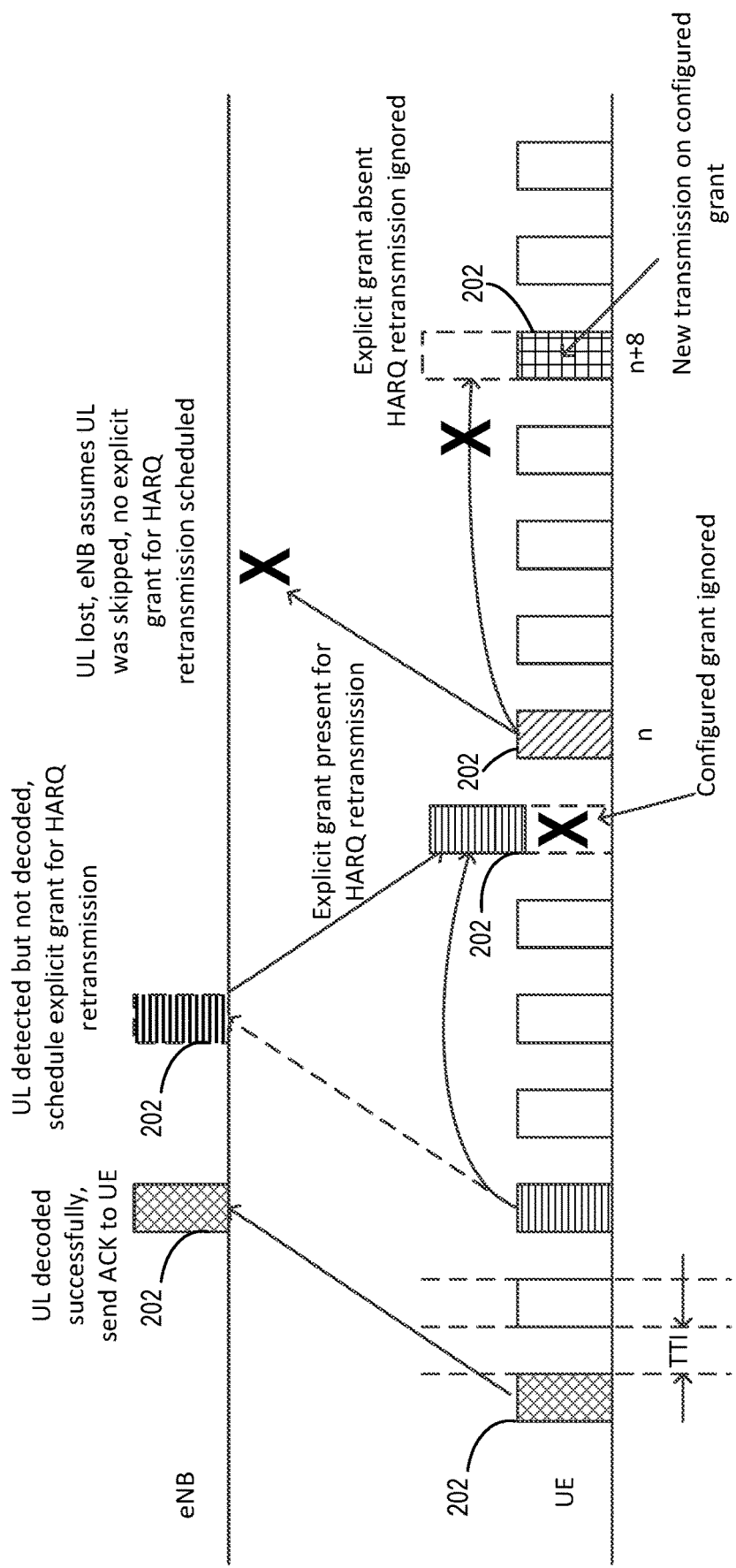
FIG. 2 is a diagram illustrating a lost uplink transmission to an enhanced Node B (eNB) which is assumed skipped consistent with embodiments disclosed herein.

In addition to increased PDCCH load, there can be additional challenges due to UL grant skipping (e.g., the UL grant can be ignored and no UL transmission happens if UE has no data to transmit in the uplink). FIG. 2 is a diagram illustrating a lost uplink transmission to an enhanced Node B (eNB) which is assumed skipped. When UL grant skipping is allowed, the eNB may not be aware whether the UL is absent or the UL is failed. Therefore, even when the eNB is configured to support HARQ retransmissions using explicit signaling (adaptive retransmissions) the decision can be erroneous. Specifically, eNB may not send an explicit grant assuming that the UL was skipped when UE in fact performed the UL transmission which got lost and eNB is unable to detect it, as depicted in FIG. 2. This may result in HARQ retransmission being ignored while the UL grant is not even used for new transmission. This skipping of the UL grant while ignoring the HARQ retransmission when there is no UL data is contrary to a goal of efficient use of the grant.

The system allows a non-adaptive Hybrid Automatic Repeat Request (HARQ) retransmission in a configured Uplink (UL) resource. In addition, as it may not be beneficial to allow non-adaptive HARQ retransmission on SPS resources for all kinds of traffic, options can be provided for configuration by network signaling and/or predefinition.

In Rel. 13, non-adaptive HARQ retransmissions are not allowed on configured UL resources (e.g., SPS resources). When the UL SPS interval is reduced, there is more likelihood of ignoring HARQ retransmissions which can reduce performance. Solving this ignoring problem by using always adaptive HARQ retransmission can be inefficient in terms of PDCCH overhead.

In addition, when UL skipping is allowed, there may be situations where UL grant is skipped while HARQ retransmission is ignored. This skipping results in inefficient utilization of resources. In addition, even supporting adaptive retransmission can cause errors because an eNB may not be able to tell whether the UL was skipped or failed.

These efficiency issues can be addressed by allowing non-adaptive retransmissions on SPS resources for all or specific traffic which can be configurable (e.g., by the network) or predefined.

To enable non-adaptive HARQ retransmission on configured UL resources (e.g., SPS resources), the configuration can be in the MAC specification and/or RRC specification to allow non-adaptive HARQ retransmission on configured UL grants. Portions of numbered descriptions are provided below to highlight possible changes. Full text of the numbered descriptions is provided in a later Examples section.

In a first embodiment, an always allow non-adaptive retransmission on configured UL grants can be used. In this embodiment, a MAC configuration can be updated such that non-adaptive HARQ retransmissions have higher priority than new transmissions on SPS resources. Examples of changes in a current MAC specification are shown below for this embodiment in descriptions 1 and 2.

Description 1 shows example changes in MAC specification section 5.4.1 to allow non-adaptive HARQ retransmission on configured UL grants for all traffic. These changes include the additions of:

else, if this Serving Cell is the SpCell and an uplink grant for this TTI has been configured for the SpCell:
    consider the NDI bit for the corresponding HARQ process to have been not toggled;
    deliver the configured uplink grant, and the associated HARQ information to the HARQ entity for this TTI.

Description 2 shows example changes in MAC specification section 5.4.2.1 to allow non-adaptive HARQ retransmission on configured UL grants for all traffic. These changes include:

else if the received grant was not addressed to a Temporary C-RNTI on PDCCH and if the NDI provided in the associated HARQ information has not been toggled compared to the value in the previous transmission of this HARQ process and if the HARQ buffer of this HARQ process is not empty:
   instruct the identified HARQ process to generate a non-adaptive retransmission.

Since a method described in Embodiment 1 may not be beneficial for some conventional traffic (for which SPS was originally intended) such as VoIP, where on-time delivery may be more crucial than reliability, other options can be possible.

For example, embodiment 2 can allow non-adaptive retransmission on configured UL grants only for certain predefined conditions. In this embodiment, non-adaptive retransmission on configured UL grants can be allowed only for certain conditions predefined in a standard. As one example, this can be allowed only for SPS intervals below a certain threshold (e.g., for intervals equal to or below 10 TTI or 5 TTI). As another example, this may be only allowed for certain types of traffic, e.g., traffic using high-reliability (such as Ultra Reliable Low Latency Communication (URLLC)).

An example of the corresponding change in a MAC specification is shown below where the text from section 5.4.2.1 can be updated as below in description 6.

else if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK:
   instruct the identified HARQ process to generate a non-adaptive retransmission.

An alternate example of the corresponding change in a MAC specification is shown below where the text from section 5.4.1 can be updated as below in description 3. Note that in addition to these changes, the changes in section 5.4.2.1 as shown in description 2 also apply for this option.

Description 3 shows example changes to MAC specification section 5.4.1 to allow non-adaptive HARQ retransmissions in preconfigured UL resources only for certain predefined conditions. These changes can include:

else, if this Serving Cell is the SpCell and an uplink grant for this TTI has been configured for the SpCell:
   if value of Uplink Semi-Persistent Scheduling interval semiPersistSchedIntervalUL is equal to or less than 5 TTI
      consider the NDI bit for the corresponding HARQ process to have been not toggled;
   else:
      consider the NDI bit for the corresponding HARQ process to have been toggled;
   deliver the configured uplink grant, and the associated HARQ information to the HARQ entity for this TTI.

Note that the criteria (e.g., threshold value) may be different and defined in terms of other measurements (e.g., TTI, subframes, ms, etc.). Note also that other conditions are also possible, such as "for DRB of type xxx" enable the non-adaptive HARQ retransmission. In addition, a combination of multiple conditions is also possible.

Embodiment 3 is enabling HARQ retransmissions when there is no data in the UL buffer for new transmission. In this embodiment, non-adaptive HARQ retransmission on a configured UL grant is allowed when there is no data in the UL buffer for a new transmission.

In one embodiment of this option, new transmissions would be sent as long as there is data for new transmissions in any LCG at the UE. An example of the corresponding change in a MAC specification is shown in description 4 below where the text from section 5.4.1 can be updated (note that in addition to description 4, the changes in section 5.4.2.1 as shown in description 2 can also apply for this option).

Description 4 shows example changes to MAC specification section 5.4.1 to allow non-adaptive HARQ retransmissions in preconfigured UL resources only when new UL data is not available. The changes can include:

else, if this Serving Cell is the SpCell and an uplink grant for this TTI has been configured for the SpCell:
   if an UL buffer at the UE has data available for transmission (i.e., UL buffer is not empty):
      consider the NDI bit for the corresponding HARQ process to have been not toggled;
   else:
      consider the NDI bit for the corresponding HARQ process to have been toggled;
   deliver the configured uplink grant, and the associated HARQ information to the HARQ entity for this TTI.

In other alternative variations of this embodiment, new transmissions would be sent when there is data for new transmission for the DRB belonging to the same LCG to which the data in the HARQ buffer of this HARQ process also belongs to. That means if the data in the UL buffer is from a different LCG, then non-adaptive HARQ retransmission would be allowed on the configured resources.

In yet another variation of this embodiment, new transmissions would be sent when there is data for new transmission for the DRB to which the data in the HARQ buffer of this HARQ process also belongs to. That means if the data in the UL buffer is from a different DRB, then non-adaptive HARQ retransmission would be allowed on the configured resources.

Embodiment 4 uses a configurable boolean parameter to allow non-adaptive retransmissions. In this embodiment, a configurable parameter is signaled by the network to the UE which is used to determine whether non-adaptive retransmission on configured UL grants is allowed or not. A boolean parameter (true/false indication) can be signaled to the UE. In one example, this indication (true/false) can be on a per MAC entity basis. For this case, the signal can be included in MAC configuration RRC signaling (e.g., a MAC-MainConfig information element), as shown in FIGS. 3A and 3B, in which the changes can include:

[[ nonAdaptiveRetransOnPreschedGrant-vXXYY    BOOLEAN
OPTIONAL        -- Need ON
]]

The MAC-MainConfig configuration can include a field entitled nonAdaptiveRetransOnPreschedGrant which has a description of: TRUE indicates that non-adaptive HARQ retransmission is allowed on the preconfigured UL grant.

In another option, the indication can be on a per LCG basis. For this case, the boolean parameter can be included in the LCG configuration as shown in FIG. 4 in which the changes can include:

```
[[  nonAdaptiveRetransOnPreschedGrant-vXXYY         BOOLEAN
    OPTIONAL                    -- Need ON
]]
```

The LogicalChannelConfig configuration (or information element) can include a field entitled nonAdaptiveRetransOnPreschedGrant which has a description of: TRUE indicates that non-adaptive HARQ retransmission is allowed on the preconfigured UL grant for this LCG.

In another option, the indication can be on a per DRB basis as shown in FIG. 5. For this case, the signal can be included in the DRB configuration (or information element). As one example, the DRB may have this indication as true if the DRB is, e.g., URLLC. As another example, it may be set to false if the traffic corresponding to the DRB is highly latency sensitive but not reliability critical. The example shows the indication included in a DRB configuration for enabling/disabling non-adaptive HARQ retransmission in the configured uplink grant. The configuration can be part of a DRB-ToAddMod information element. The changes can include:

```
[[  nonAdaptiveRetransOnPreschedGrant-vXXYY         BOOLEAN
OPTIONAL              -- Need ON
]]
```

The RadioResourceConfigDedicated configuration can include a field entitled nonAdaptiveRetransOnPreschedGrant which has a description of: TRUE indicates that non-adaptive HARQ retransmission is allowed for this DRB on the preconfigured UL grant.

In yet another option, the indication can be included in the SPS configuration or information element as shown in FIG. 6. The example shows the indication included in the UL SPS configuration called SPS-ConfigUL for enabling/disabling non-adaptive HARQ retransmission in the configured uplink grant. The changes can include:

```
[[  nonAdaptiveRetrans-vXXYY    BOOLEAN    OPTIONAL     --
Need ON
            ]]
```

The SPS-Config configuration can include a field entitled nonAdaptiveRetrans, which has a description of: TRUE indicates that non-adaptive HARQ retransmission is allowed on the UL grant configured by this SPS configuration.

For the options described above, an example of the corresponding changes in a MAC specification is shown in description 5 below (note that in addition to Description 5, the changes in section 5.4.2.1 as shown in Description 2 also apply for this option).

Description 5 shows an example of changes to MAC specification section 5.4.1 to allow non-adaptive HARQ retransmissions in preconfigured UL resources based on a network configured parameter. Note that the added condition above may include reference to nonAdaptiveRetrans or nonAdaptiveRetransOnPreschedGrant and additional condition(s) such as "for this LCG" or "for this DRB," etc. based on the option described above. These changes can include:

else, if this Serving Cell is the SpCell and an uplink grant for this TTI has been configured for the SpCell:

if non-adaptive retransmissions on prescheded grant is configured and the value is set to TRUE:

consider the NDI bit for the corresponding HARQ process to have been not toggled;

else:

consider the NDI bit for the corresponding HARQ process to have been toggled;

deliver the configured uplink grant, and the associated HARQ information to the HARQ entity for this TTI.

Embodiment 5 is a configurable threshold parameter used to enable non-adaptive retransmissions. In this embodiment, a condition/threshold described in embodiment 2 can be made configurable by the network using similar signaling methods as explained in embodiment 4. For example, a threshold SPS interval below or at which the non-adaptive retransmission is allowed on the configured grant can be included as a configurable parameter in the SPS configuration as shown in FIG. 7. The changes can include:

```
[[      nonAdaptiveRetransIntervalThr-vXXYY     ENUMERATED {
                                                sf20, sf10, sf5, sf4, sf3, sf2,
                                                sf1, spare1},
        OPTIONAL    -- Need ON
        ]]
```

The SPS-Config configuration can include a field entitled nonAdaptiveRetransIntervalThr with a definition of: threshold of semi-persistent scheduling interval in uplink to allow non-adaptive HARQ retransmission on the UL grant configured by this SPS configuration. Value in number of sub-frames. Value sf20 corresponds to 20 sub-frames, sf10 corresponds to 10 sub-frames, and so on.

Note that the values 20, 10, 5, etc. subframes shown for the threshold above are just examples. Different values may be defined and different numbers of spare values may be left for future use.

Other options where the configuration is included in the MAC configuration, LCG configuration or DRB configuration similar to those in embodiment 4 are also possible. Other types of conditions/thresholds as explained in embodiment 2 can be signaled using these options.

Embodiment 6 is enabling non-adaptive retransmissions with a configuration using a system information broadcast. In this embodiment, a similar configurable parameter explained in embodiments 4 and 5 can be signaled to the UE by the network using a system information broadcast (e.g., SIB2 or other existing SIB or a new SIB can be defined).

It should be noted that the above ideas are not restricted by the examples of embodiments shown above; other combinations or variations of the above embodiments are also possible while the basic principles remain the same. As an example a configurable parameter is signaled by the network (using RRC or SIB) to indicate whether non-adaptive retransmission is allowed or not only when there is no data in the UL buffer for new transmission (combination of embodiments 3/6 and 4). Familiar terms used in LTE standards for channels, message names, etc. are reused for simplicity but they are not intended to limit the applicability of the embodiments to future embodiments of cellular technology.

Figure 8:
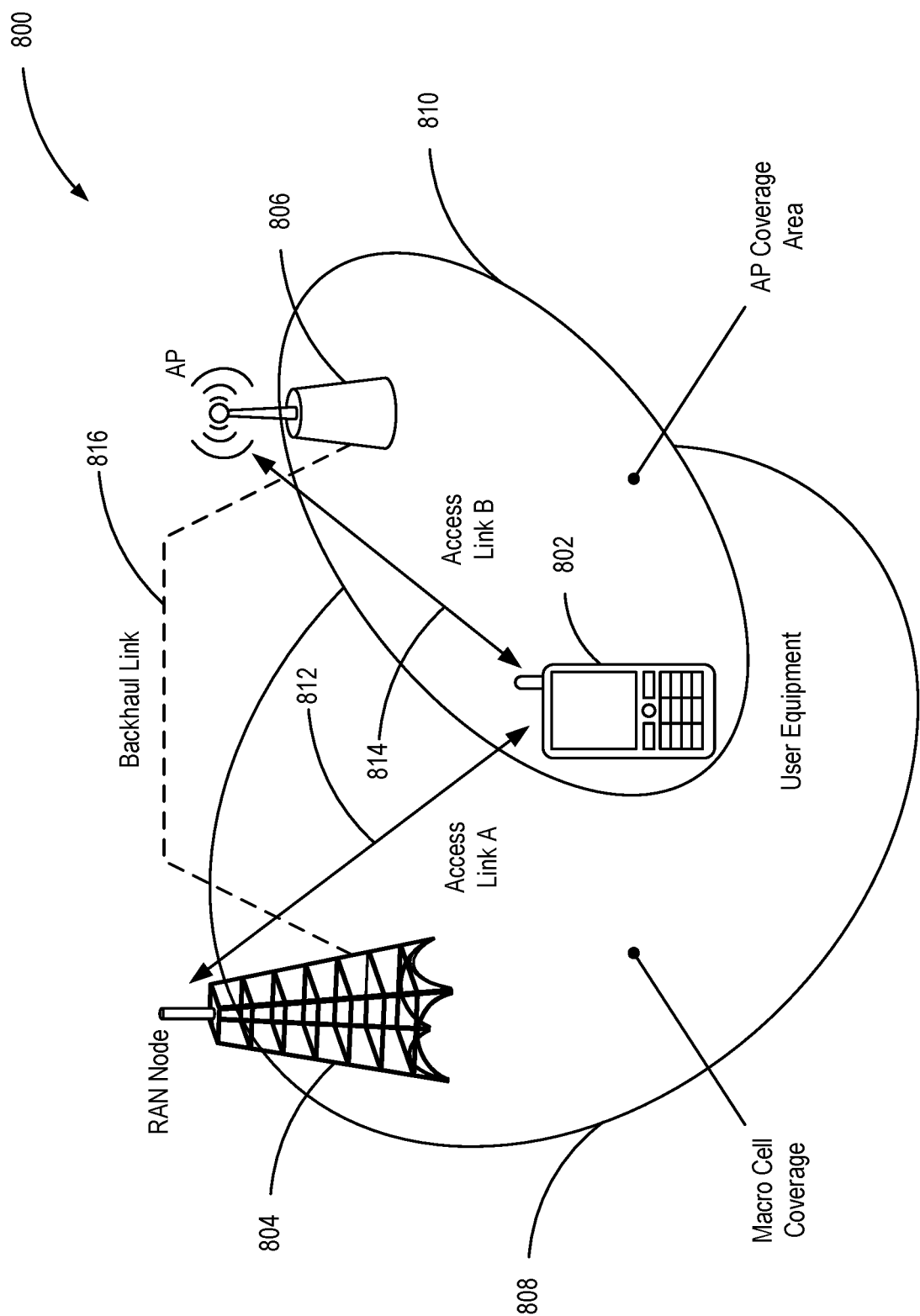
FIG. 8 is an example of a portion of a radio access network (RAN) system that includes a cellular air interface being provided between a RAN node and a user equipment (UE) consistent with embodiments disclosed herein.

FIG. 8 is an example of a portion of a radio access network (RAN) system that includes a cellular air interface being provided between a RAN node and a UE. Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. Mobile broadband networks can include various high speed data technologies, such as 3GPP LTE systems. In 3GPP radio access networks (RANs) in LTE systems, the base station can include RAN Nodes such as Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Turning to FIG. 8, an example of a portion of a radio access network (RAN) system 800 that includes a single cellular air interface (such as an LTE/LTE-Advanced access link) being provided between the RAN Node 804 and the UE 802 (i.e., on Access Link A), and an air interface (a supplemental network interface such as a wireless local area network (WLAN) based interface) being provided between the access point (AP) 806 and the UE 802 (i.e., on Access Link B). UE 802 is located within macro cell coverage 808. The UE 802 determines that connection with a WLAN AP 806 will be beneficial to a user of the UE 802. In some embodiments, the UE 802 retains Access Link A to RAN Node 804. The UE 802 can offload some or part of wireless services onto Access Link A. In other embodiments, the UE 802 disconnects from Access Link A and moves all wireless services to Access Link B. In some embodiments Access Link A and Access Link B use a same frequency and technology. In other embodiments, Access Link A and Access Link B use different frequencies (e.g., LTE licensed frequencies and unlicensed frequencies) and/or different link technology (e.g., LTE and Wi-Fi). In other embodiments, Access Link A and Access Link B use different frequencies and the similar link technology (e.g., LTE and LTE over mmWave).

Figure 9:
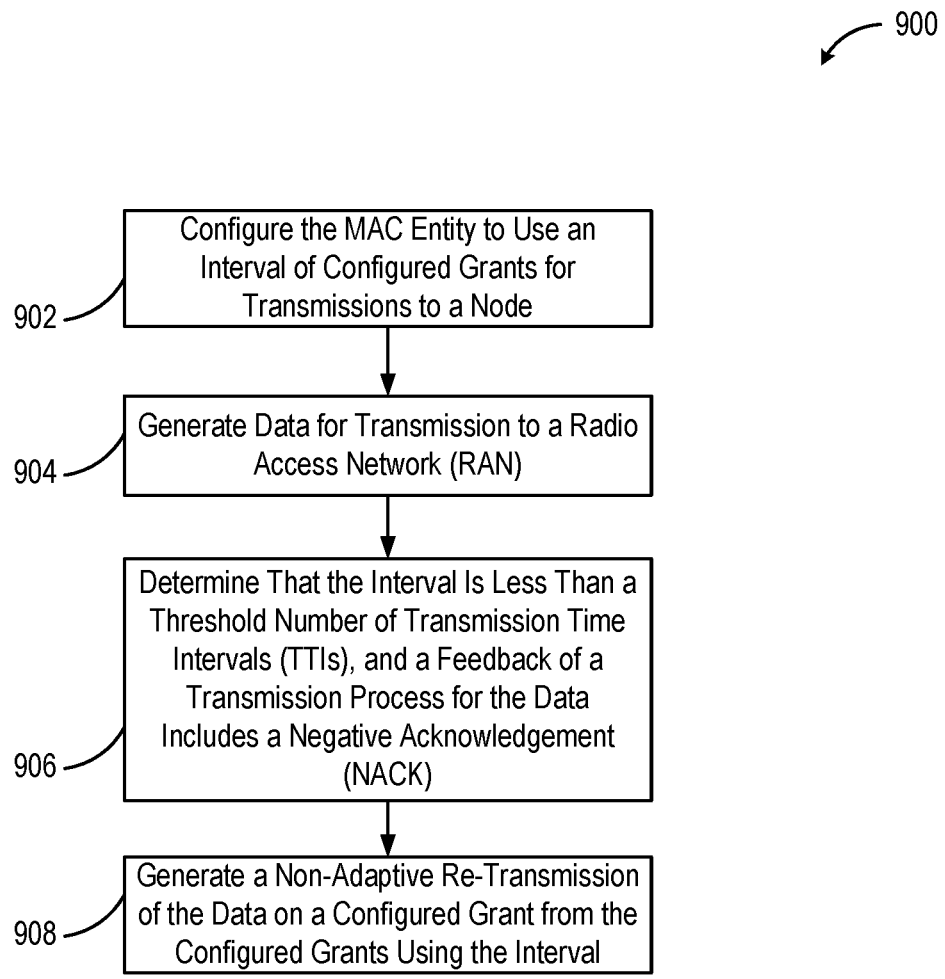
FIG. 9 is a flow chart illustrating a method for non-adaptive retransmission using configured grants, e.g., SPS resources consistent with embodiments disclosed herein.

FIG. 9 is a flow chart illustrating a method for non-adaptive retransmission using SPS resources consistent with embodiments disclosed herein. The method can be accomplished by systems such as those described herein, including the UE 802 and RAN Node 804 shown in FIG. 8. In block 902, a MAC entity is configured to use an interval of configured grants for transmissions to a node. In block 904, the MAC entity generates data for transmission to a RAN. In block 906, the MAC entity determines that the interval is less than a threshold number of transmission time intervals (TTIs) or subframes, and a feedback of a transmission process for the data includes a negative acknowledgement (NACK). In block 908, the MAC entity generates a non-adaptive re-transmission of the data on a configured grant corresponding to the configured interval.

Figure 10:
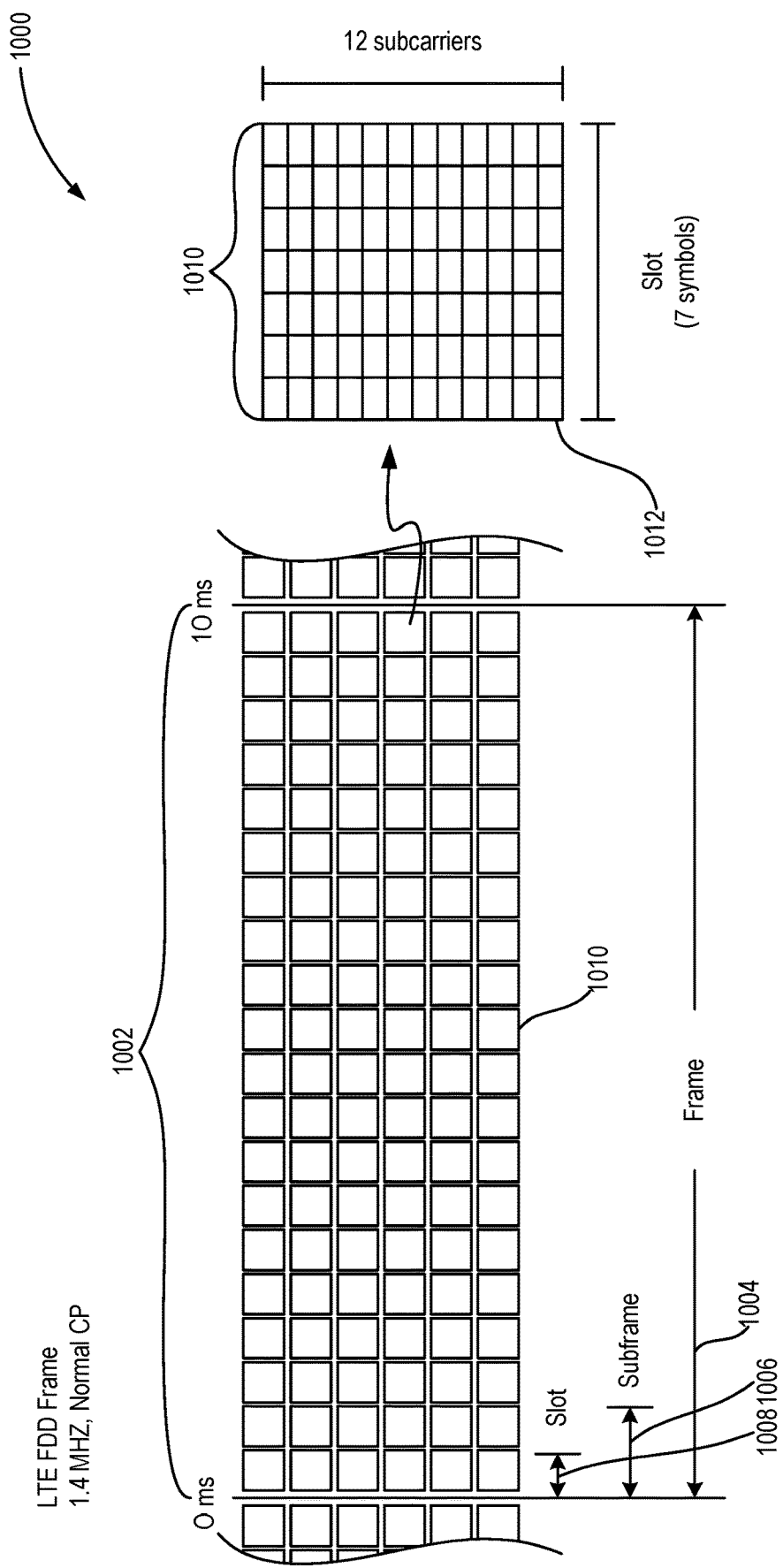
FIG. 10 is a schematic diagram illustrating long term evolution (LTE) communication frame consistent with embodiments disclosed herein.

FIG. 10 is a schematic diagram 1000 illustrating long term evolution (LTE) communication frame 1004 of 10 ms duration 1002. In one embodiment, each frequency allocation (carrier) can be in 108 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). Frame 1004 can be 10 ms with each slot 1008 being 0.5 ms (and each subframe 1006 being 1 ms).

Slot 1008 at a carrier is resource block 1010, which includes seven symbols at 12 orthogonal frequency-division multiplexing (OFDM) subcarriers. Resource element 1012 is one OFDM subcarrier for the duration of one OFDM symbol. Resource block 1010 can include 84 resource elements 1012 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

Figure 11:
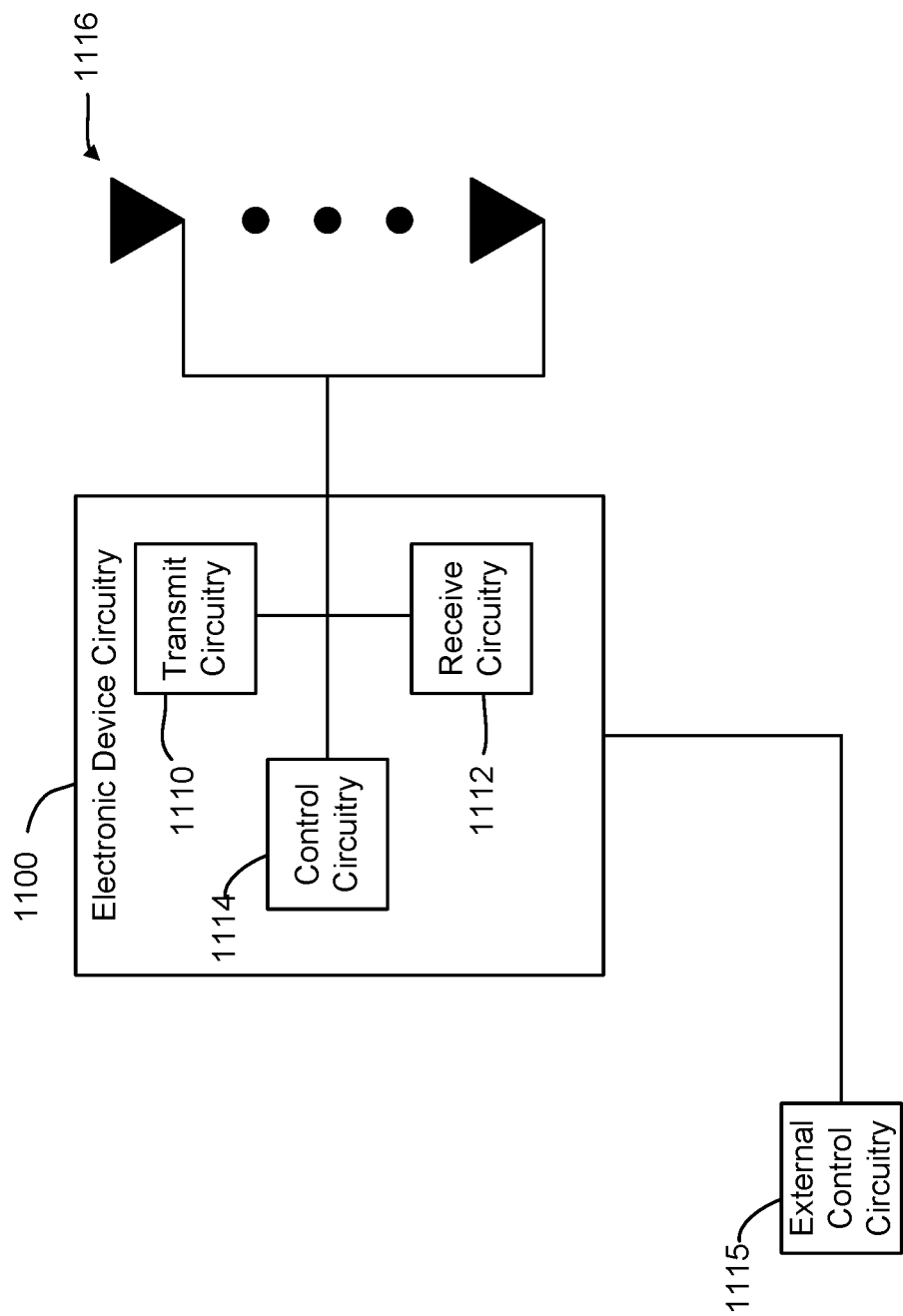
FIG. 11 is a block diagram illustrating electronic device circuitry that may be radio access node (RAN) node circuitry (such as an eNB circuitry), UE circuitry, network node circuitry, or some other type of circuitry consistent with embodiments disclosed herein.

FIG. 11 is a block diagram illustrating electronic device circuitry 1100 that may be radio access node (RAN) node circuitry (such as an eNB circuitry), UE circuitry, network node circuitry, or some other type of circuitry in accordance with various embodiments. In embodiments, the electronic device circuitry 1100 may be, or may be incorporated into or otherwise a part of, a RAN Node (e.g., an eNB), a UE, a mobile station (MS), a BTS, a network node, or some other type of electronic device. In embodiments, the electronic device circuitry 1100 may include radio transmit circuitry 1110 and receive circuitry 1112 coupled to control circuitry 1114 (e.g., baseband processor(s), etc.). In embodiments, the transmit circuitry 1110 and/or receive circuitry 1112 may be elements or modules of transceiver circuitry, as shown. In some embodiments, some or all of the control circuitry 1115 can be in a device separate or external from the transmit circuitry 1110 and the receive circuitry 1112 (baseband processors shared by multiple antenna devices, as in cloud-RAN (C-RAN) implementations, for example).

The electronic device circuitry 1100 may be coupled with one or more plurality of antenna elements 1116 of one or more antennas. The electronic device circuitry 1100 and/or the components of the electronic device circuitry 1100 may be configured to perform operations similar to those described elsewhere in this disclosure.

In embodiments where the electronic device circuitry 1100 is or is incorporated into or otherwise part of a UE, the transmit circuitry 1110 can transmit non-adaptive retransmissions as described herein. The receive circuitry 1112 can receive grant information as described herein.

In embodiments where the electronic device circuitry 1100 is an eNB, a BTS and/or a network node, or is incorporated into or is otherwise part of an eNB, a BTS and/or a network node, the transmit circuitry 1110 can transmit grant information as described herein. The receive circuitry 1112 can receive non-adaptive retransmissions as described herein.

In certain embodiments, the electronic device circuitry 1100 shown in FIG. 11 is operable to perform one or more methods, such as the methods shown in FIG. 9.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
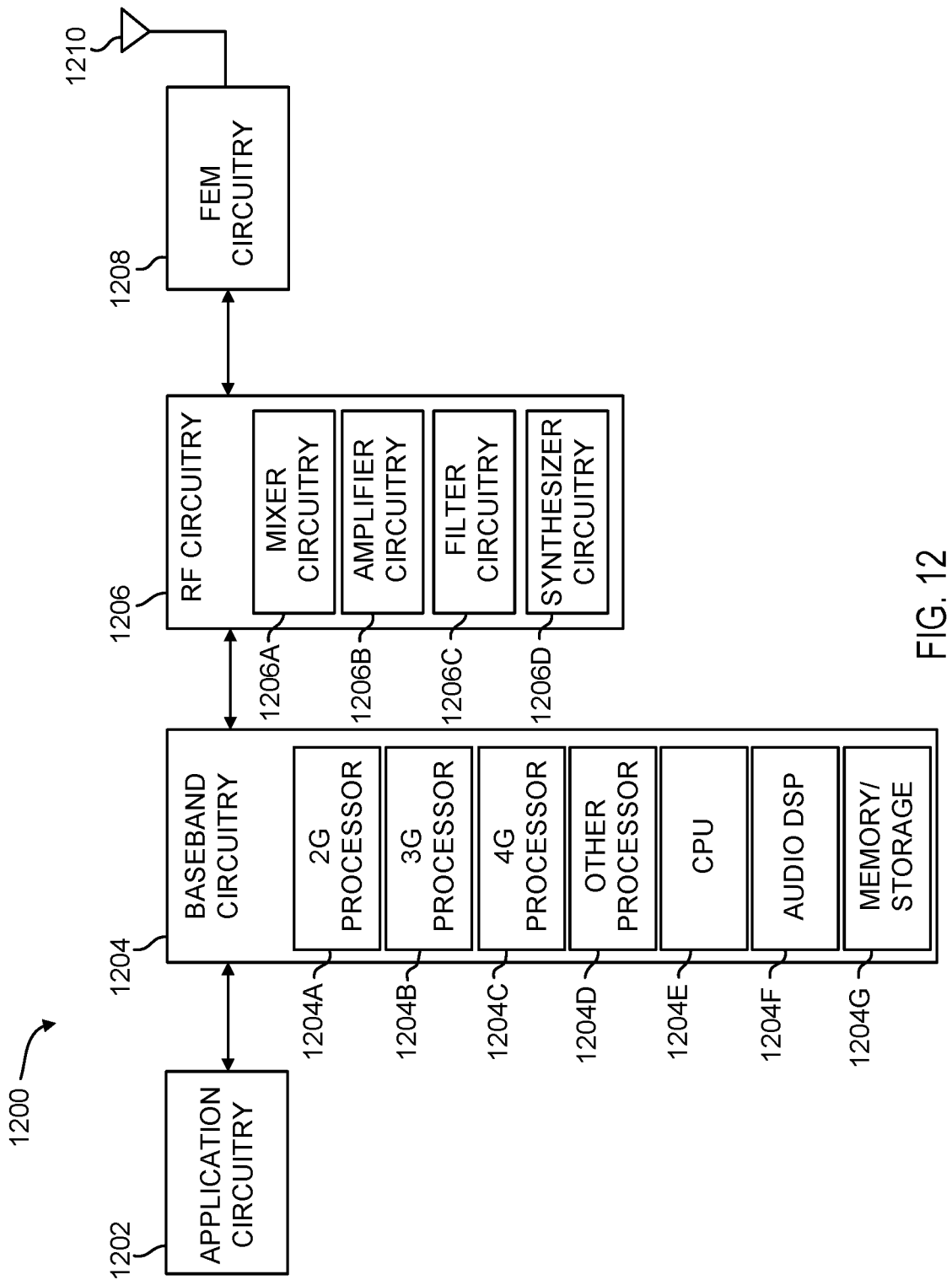
FIG. 12 is a block diagram illustrating, for one embodiment, example components of a user equipment (UE) or mobile station (MS) device consistent with embodiments disclosed herein.

Embodiments described herein may be implemented into a system using any suitably configured hardware and/or software. FIG. 12 is a block diagram illustrating, for one embodiment, example components of a user equipment (UE) or mobile station (MS) device 1200. In some embodiments, the UE device 1200 may include application circuitry 1202, baseband circuitry 1204, Radio Frequency (RF) circuitry 1206, front-end module (FEM) circuitry 1208, and one or more antennas 1210, coupled together at least as shown in FIG. 12.

The application circuitry 1202 may include one or more application processors. By way of non-limiting example, the application circuitry 1202 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1204 may include one or more single-core or multi-core processors. The baseband circuitry 1204 may include one or more baseband processors and/or control logic. The baseband circuitry 1204 may be configured to process baseband signals received from a receive signal path of the RF circuitry 1206. The baseband 1204 may also be configured to generate baseband signals for a transmit signal path of the RF circuitry 1206. The baseband processing circuitry 1204 may interface with the application circuitry 1202 for generation and processing of the baseband signals, and for controlling operations of the RF circuitry 1206.

By way of non-limiting example, the baseband circuitry 1204 may include at least one of a second generation (2G) baseband processor 1204A, a third generation (3G) baseband processor 1204B, a fourth generation (4G) baseband processor 1204C, other baseband processor(s) 1204D for other existing generations, and generations in development or to be developed in the future (e.g., fifth generation (5G), 6G, etc.). The baseband circuitry 1204 (e.g., at least one of baseband processors 1204A-1204D) may handle various radio control functions that enable communication with one or more radio networks via the RF circuitry 1206. By way of non-limiting example, the radio control functions may include signal modulation/demodulation, encoding/decoding, radio frequency shifting, other functions, and combinations thereof. In some embodiments, modulation/demodulation circuitry of the baseband circuitry 1204 may be programmed to perform Fast-Fourier Transform (FFT), precoding, constellation mapping/demapping functions, other functions, and combinations thereof. In some embodiments, encoding/decoding circuitry of the baseband circuitry 1204 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1204 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204E of the baseband circuitry 1204 may be programmed to run elements of the protocol stack for signaling of the PHY, MAC, RLC, PDCP and/or RRC layers. In some embodiments, the baseband circuitry 1204 may include one or more audio digital signal processor(s) (DSP) 1204F. The audio DSP(s) 1204F may include elements for compression/decompression and echo cancellation. The audio DSP(s) 1204F may also include other suitable processing elements.

The baseband circuitry 1204 may further include memory/storage 1204G. The memory/storage 1204G may include data and/or instructions for operations performed by the processors of the baseband circuitry 1204 stored thereon. In some embodiments, the memory/storage 1204G may include any combination of suitable volatile memory and/or non-volatile memory. The memory/storage 1204G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1204G may be shared among the various processors or dedicated to particular processors.

Components of the baseband circuitry 1204 may be suitably combined in a single chip, a single chipset, or disposed on a same circuit board in some embodiments. In some embodiments, some or all of the constituent components of the baseband circuitry 1204 and the application circuitry 1202 may be implemented together, such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

The RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. The RF circuitry 1206 may include a receive signal path which may include circuitry to down-convert RF signals received from the FEM circuitry 1208, and provide baseband signals to the baseband circuitry 1204. The RF circuitry 1206 may also include a transmit signal path which may include circuitry to up-convert baseband signals provided by the baseband circuitry 1204, and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206A, amplifier circuitry 1206B, and filter circuitry 1206C. The transmit signal path of the RF circuitry 1206 may include filter circuitry 1206C and mixer circuitry 1206A. The RF circuitry 1206 may further include synthesizer circuitry 1206D configured to synthesize a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals.

The filter circuitry 1206C may include a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may include zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by filter circuitry 1206C. The filter circuitry 1206C may include a low-pass filter (LPF), although the scope of the embodiments is not limited in this respect. In some embodiments, the mixer circuitry 1206A of the receive signal path and the mixer circuitry 1206A of the transmit signal path may include two or more mixers, and may be arranged for quadrature downconversion and/or upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and/or direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1206 may include analog-to-digital converter (ADC) and digital-to-analog converter (DAC) circuitry, and the baseband circuitry 1204 may include a digital baseband interface to communicate with the RF circuitry 1206.

In some dual-mode embodiments, separate radio IC circuitry may be provided for processing signals for each spectrum, although the scope of the embodiments is not limited in this respect.

In some embodiments, the synthesizer circuitry 1206D may include one or more of a fractional-N synthesizer and a fractional N/N+1 synthesizer, although the scope of the embodiments is not limited in this respect as other types of frequency synthesizers may be suitable. For example, synthesizer circuitry 1206D may include a delta-sigma synthesizer, a frequency multiplier, a synthesizer comprising a phase-locked loop with a frequency divider, other synthesizers and combinations thereof.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

The synthesizer circuitry 1206D of the RF circuitry 1206 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1206D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

The FEM circuitry 1208 may include a receive signal path which may include circuitry configured to operate on RF signals received from one or more antennas 1210, amplify the received signals, and provide the amplified versions of the received signals to the RF circuitry 1206 for further processing. The FEM circuitry 1208 may also include a transmit signal path which may include circuitry configured to amplify signals for transmission provided by the RF circuitry 1206 for transmission by at least one of the one or more antennas 1210.

In some embodiments, the FEM circuitry 1208 may include a TX/RX switch configured to switch between a transmit mode and a receive mode operation. The FEM circuitry 1208 may include a receive signal path and a transmit signal path. The receive signal path of the FEM circuitry 1208 may include a low-noise amplifier (LNA) to amplify received RF signals and provide the amplified received RF signals as an output (e.g., to the RF circuitry 1206). The transmit signal path of the FEM circuitry 1208 may include a power amplifier (PA) configured to amplify input RF signals (e.g., provided by RF circuitry 1206), and one or more filters configured to generate RF signals for subsequent transmission (e.g., by one or more of the one or more antennas 1210.

In some embodiments, the MS device 1200 may include additional elements such as, for example, memory/storage, a display, a camera, one of more sensors, an input/output (I/O) interface, other elements, and combinations thereof.

In some embodiments, the MS device 1200 may be configured to perform one or more processes, techniques, and/or methods as described herein, or portions thereof.

Figure 13:
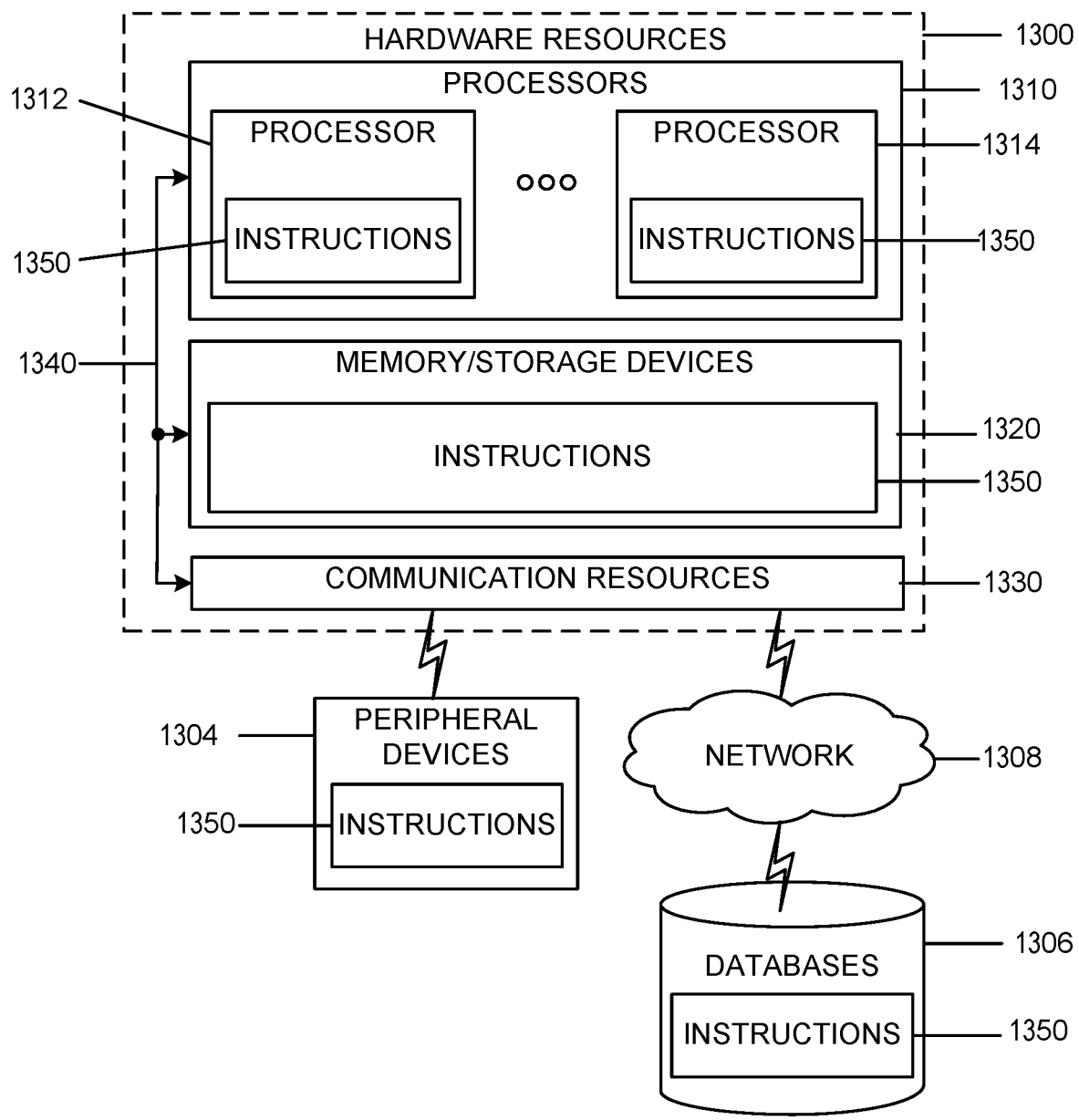
FIG. 13 is a block diagram illustrating components able to read instructions from a machine-readable or computer-readable medium (e.g., a machine-readable storage medium) and perform any one or more of the methodologies discussed herein consistent with embodiments disclosed herein.

FIG. 13 is a block diagram illustrating components, according to some example embodiments, able to read instructions from a machine-readable or computer-readable medium (e.g., a machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which are communicatively coupled via a bus 1340.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314. The memory/storage devices 1320 may include main memory, disk storage, or any suitable combination thereof.

The communication resources 1330 may include interconnection and/or network interface components or other suitable devices to communicate with one or more peripheral devices 1304 and/or one or more databases 1306 via a network 1308. For example, the communication resources 1330 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 and/or the databases 1306. Accordingly, the memory of processors 1310, the memory/storage devices 1320, the peripheral devices 1304, and the databases 1306 are examples of computer-readable and machine-readable media.

EXAMPLES

The following examples pertain to further embodiments.

Example 1 is an apparatus for use in a user equipment (UE). The apparatus includes storage for a semi-persistent scheduling (SPS) uplink (UL) interval. The apparatus includes one or more baseband processing units designed to decode a radio resource control (RRC) message including an SPS configuration with the SPS UL interval, and store data in a hybrid automatic repeat request (HARQ) buffer associated with a HARQ process for transmission to a radio access network (RAN) node. The apparatus includes one or more baseband processing units designed to determine that the SPS UL interval is less than a threshold number of subframes, the HARQ buffer associated with the HARQ process is not empty, and a HARQ feedback of the HARQ process includes a negative acknowledgement (NACK) and generate a non-adaptive re-transmission of the data on a designed UL grant using the SPS UL interval.

Example 2 is the apparatus of Example 1, where the threshold number of subframes is 10 subframes.

Example 3 is the apparatus of Example 1, where the designed UL grant is an SPS resource.

Example 4 is the apparatus of Example 1, where the SPS configuration further includes a configuration to skip a UL transmission for the designed UL grant if no data is available for transmission in a UE buffer.

Example 5 is the apparatus of Example 1, where the SPS configuration further includes an SPS-Config information element.

Example 6 is the apparatus of Example 1, where one subframe is a transmission time interval (TTI).

Example 7 is the apparatus of Example 1, where a transmission time interval (TTI) includes one or more subframes and the threshold number of subframes is 10 TTIs.

Example 8 is the apparatus of Example 1, where the non-adaptive re-transmission is a non-adaptive hybrid automatic repeat request (HARQ) re-transmission.

Example 9 is the apparatus of Example 1, where the designed UL grant is an SPS resource on the UL shared channel.

Example 10 is the apparatus of Example 1, where the non-adaptive re-transmission is performed on a same resource and with a same modulation and coding scheme (MCS) as was used for a last made transmission attempt.

Example 11 is the apparatus of Example 1, where the RAN node is a fifth generation enhanced node B (5G eNB).

Example 12 is an apparatus for use in a radio access network (RAN) node. The apparatus includes storage for a semi-persistent scheduling (SPS) uplink (UL) interval. The apparatus also includes one or more baseband processing units designed to encode a radio resource control (RRC) message for a user equipment (UE) including an SPS configuration with the SPS UL interval that is less than a threshold number of subframes, encode a hybrid automatic repeat request (HARQ) feedback for a HARQ process that includes a negative acknowledgement (NACK), and decode a non-adaptive re-transmission of data on a designed UL grant using the SPS UL interval.

Example 13 is the apparatus of Example 12, where the one or more baseband processing units are further designed to process a transmission of the data using a modulation and coding scheme (MCS), and use the MCS to process the non-adaptive re-transmission of the data.

Example 14 is the apparatus of Example 12, where the threshold number of subframes is 10 subframes.

Example 15 is the apparatus of Example 12, where the designed UL grant is an SPS resource.

Example 16 is the apparatus of Example 12, where the SPS configuration further includes a configuration to skip a UL transmission for the designed UL grant if no data is available for transmission in a UE buffer.

Example 17 is the apparatus of Example 12, where the SPS configuration further includes an SPS-Config information element.

Example 18 is the apparatus of Example 12, where to process a non-adaptive re-transmission on the designed UL grant further includes to generate an indicator of the non-adaptive re-transmission on the designed UL grant to the RAN Node.

Example 19 is the apparatus of Example 12, where the RAN node is an enhanced Node B (eNB).

Example 20 is a computer program product comprising a computer-readable storage medium that stores instructions for execution by a processor to perform operations of a medium access control (MAC) entity, the instructions, when executed by the processor, cause the processor to design the MAC entity to use an interval of designed grants for transmissions to a node. A computer program product further comprises encoding data for transmission to a radio access network (RAN), determine that the interval is less than a threshold number of transmission time intervals (TTIs), and a feedback of a transmission process for the data includes a negative acknowledgement (NACK), and encode a non-adaptive re-transmission of the data on a designed grant from the designed grants using the interval.

Example 21 is the computer program product of Example 20, where the interval is a semi-persistent scheduling (SPS) uplink (UL) interval.

Example 22 is the computer program product of Example 20, where the node is an enhanced Node B (eNB).

Example 23 is the computer program product of Example 20, where the TTI is one subframe.

Example 24 is the computer program product of Example 20, where the threshold number of TTIs is 10 TTIs.

ADDITIONAL EXAMPLES

Example 1 may comprise of an LTE UE which can transmit non-adaptive HARQ retransmission on UL using preconfigured grant.

Example 2 may comprise of the UE of example 1 where the said grant may be preconfigured using semi-persistent-scheduling (SPS).

Example 3 may comprise of the UE of examples 1-2, where the said non-adaptive HARQ retransmission on pre-configured grant is done for all traffic.

Example 4 may comprise of the UE of examples 1-2, where the said non-adaptive HARQ retransmission on pre-configured grant is done for specific traffic/conditions satisfying certain threshold or criteria.

Example 5 may comprise of the UE of example 4 where one example of said threshold/criteria is defined as the SPS periodicity/interval below or at which the non-adaptive HARQ retransmission can be done on preconfigured grant.

Example 6 may comprise of the UE of example 4 where one example of said threshold/criteria is defined as the type of traffic/DRB (e.g., URLLC) for which the non-adaptive HARQ retransmission can be done on preconfigured grant.

Example 7 may comprise of the UE of examples 4-6 wherein the said threshold/criteria is predefined in the standard.

Example 8 may comprise of the UE of examples 4-6 wherein the said threshold/criteria is configurable and signaled by the network to the UE.

Example 9 may comprise of the UE of example 8 where the said signaling of the configuration by the network is done using RRC signaling.

Example 10 may comprise of the UE of example 8 where the said signaling of the configuration by the network is done using a system information broadcast (e.g., SIB2, or other existing SIB, or a new SIB can be defined).

Example 11 may comprise of the UE of examples 9-10 wherein the said configuration is on per MAC entity basis.

Example 12 may comprise of the UE of example 9-10 wherein the said configuration is on per LCG basis.

Example 13 may comprise of the UE of example 9-10 wherein the said configuration is on per DRB basis.

Example 14 may comprise of the UE of examples 1-2, where the said non-adaptive HARQ retransmission on preconfigured grant is done only when there is no data in the UE's UL buffer for new transmission (i.e., no HARQ non-adaptive retransmission if there is data in the UL buffer for new transmission).

Example 15 may comprise of the UE of example 14 wherein the said non-adaptive HARQ retransmission on preconfigured grant is done as long as the said data in the UE's UL buffer for new transmission belongs to different LCG.

Example 16 may comprise of the UE of example 14 wherein the said non-adaptive HARQ retransmission on preconfigured grant is done as long as the said data in the UE's UL buffer for new transmission belongs to different DRB.

Example 17 may comprise of the UE of example 4, wherein the said conditions/criteria may be combination of said conditions/criteria of examples 5-16.

Example 18 may comprise of an LTE eNB which can signal a UE to perform non-adaptive UL HARQ retransmission on preconfigured resources.

Example 19 may comprise of the eNB of example 18 wherein the said configuration is signaled to the UE via RRC configuration/reconfiguration signaling.

Example 20 may comprise of the example 18 wherein the said configuration is signaled to the UE using a network broadcast using a system information broadcast (e.g., SIB2, or other existing SIB, or a new SIB can be defined).

Example 21 may comprise of the eNB of examples 19-20, where the said signaling to UE is done for specific traffic/conditions satisfying certain threshold or criteria.

Example 22 may comprise of the eNB of example 21 where one example of said threshold/criteria is defined as the SPS periodicity/interval below or at which the non-adaptive HARQ retransmission can be done on preconfigured grant.

Example 23 may comprise of the eNB of example 21 where one example of said threshold/criteria is defined as the type of traffic/DRB (e.g., URLLC) for which the non-adaptive HARQ retransmission can be done on preconfigured grant.

Example 24 may comprise of the eNB of examples 19-20, wherein the said configuration is on per MAC entity basis.

Example 25 may comprise of the eNB of examples 19-20, wherein the said configuration is on per LCG basis.

Example 26 may comprise of the eNB of examples 19-20, wherein the said configuration is on per DRB basis.

Description 1 can include:
5.4.1 UL Grant reception
In order to transmit on the UL-SCH the MAC entity has a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers. If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
  if an uplink grant for this TTI and this Serving Cell has been received on the PDCCH for the MAC entity's C-RNTI or Temporary C-RNTI; or if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
    consider the NDI to have been toggled for the corresponding HARQ process regardless of the value of the NDI.
  deliver the uplink grant and the associated HARQ information to the HARQ entity for this TTI.
else, if this Serving Cell is the SpCell and if an uplink grant for this TTI has been received for the SpCell on the PDCCH of the SpCell for the MAC entity's Semi-Persistent Scheduling C-RNTI:
  if the NDI in the received HARQ information is 1:
    consider the NDI for the corresponding HARQ process not to have been toggled;
    deliver the uplink grant and the associated HARQ information to the HARQ entity for this TTI.
  else if the NDI in the received HARQ information is 0:
    if PDCCH contents indicate SPS release:
      clear the configured uplink grant (if any).
    else:
      store the uplink grant and the associated HARQ information as configured uplink grant;
      initialise (if not active) or re-initialise (if already active) the configured uplink grant to start in this TTI and to recur according to rules in subclause 5.10.2;
      consider the NDI bit for the corresponding HARQ process to have been toggled;
      deliver the configured uplink grant and the associated HARQ information to the HARQ entity for this TTI.
else, if this Serving Cell is the SpCell and an uplink grant for this TTI has been configured for the SpCell:
  consider the NDI bit for the corresponding HARQ process to have been not toggled;
  deliver the configured uplink grant, and the associated HARQ information to the HARQ entity for this TTI.
NOTE: The period of configured uplink grants is expressed in TTIs.
NOTE: If the MAC entity receives both a grant in a Random Access Response and a grant for its C-RNTI or Semi persistent scheduling C-RNTI enabling transmissions on the SpCell in the same UL subframe, the MAC entity may choose to continue with either the grant for its RA-RNTI or the grant for its C-RNTI or Semi persistent scheduling C-RNTI.
NOTE: When a configured uplink grant is indicated during a measurement gap and indicates an UL-SCH transmission during a measurement gap, the MAC entity processes the grant but does not transmit on UL-SCH.

Description 2 can include:
5.4.2 HARQ operation
5.4.2.1 HARQ entity
For each TTI, the HARQ entity shall:
  identify the HARQ process(es) associated with this TTI, and for each identified HARQ process:
    if an uplink grant has been indicated for this process and this TTI:
      if the received grant was not addressed to a Temporary C-RNTI on PDCCH and if the NDI provided in the associated HARQ information has been toggled compared to the value in the previous transmission of this HARQ process; or
      if the uplink grant was received on PDCCH for the C-RNTI and the HARQ buffer of the identified process is empty; or
      if the uplink grant was received in a Random Access Response:
        if there is a MAC PDU in the Msg3 buffer and the uplink grant was received in a Random Access Response:
          obtain the MAC PDU to transmit from the Msg3 buffer.
        else:
          obtain the MAC PDU to transmit from the "Multiplexing and assembly" entity;
        deliver the MAC PDU and the uplink grant and the HARQ information to the identified HARQ process;
        instruct the identified HARQ process to trigger a new transmission.
      else if the received grant was not addressed to a Temporary C-RNTI on PDCCH and if the NDI provided in the associated HARQ information has not been toggled compared to the value in the previous transmission of this HARQ process and if the HARQ buffer of this HARQ process is not empty:
        instruct the identified HARQ process to generate a non-adaptive retransmission.
      else:
        deliver the uplink grant and the HARQ information (redundancy version) to the identified HARQ process;
        instruct the identified HARQ process to generate an adaptive retransmission.
    else, if the HARQ buffer of this HARQ process is not empty:
      instruct the identified HARQ process to generate a non-adaptive retransmission.
When determining if NDI has been toggled compared to the value in the previous transmission the MAC entity shall ignore NDI received in all uplink grants on PDCCH for its Temporary C-RNTI.

Description 3 can include:
5.4.1 UL Grant reception
In order to transmit on the UL-SCH the MAC entity has a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers. If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
  if an uplink grant for this TTI and this Serving Cell has been received on the PDCCH for the MAC entity's C-RNTI or Temporary C-RNTI; or
  if an uplink grant for this TTI has been received in a Random Access Response:
    if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
    consider the NDI to have been toggled for the corresponding HARQ process regardless of the value of the NDI.
deliver the uplink grant and the associated HARQ information to the HARQ entity for this TTI.
else, if this Serving Cell is the SpCell and if an uplink grant for this TTI has been received for the SpCell on the PDCCH of the SpCell for the MAC entity's Semi-Persistent Scheduling C-RNTI:
  if the NDI in the received HARQ information is 1:
    consider the NDI for the corresponding HARQ process not to have been toggled;
    deliver the uplink grant and the associated HARQ information to the HARQ entity for this TTI.
  else if the NDI in the received HARQ information is 0:
    if PDCCH contents indicate SPS release:
      clear the configured uplink grant (if any).
    else:
      store the uplink grant and the associated HARQ information as configured uplink grant;
      initialise (if not active) or re-initialise (if already active) the configured uplink grant to start in this TTI and to recur according to rules in subclause 5.10.2;
      consider the NDI bit for the corresponding HARQ process to have been toggled;
      deliver the configured uplink grant and the associated HARQ information to the HARQ entity for this TTI.
else, if this Serving Cell is the SpCell and an uplink grant for this TTI has been configured for the SpCell:
  if value of Uplink Semi-Persistent Scheduling interval semiPersistSchedIntervalUL is equal to or less than 5 TTI
    consider the NDI bit for the corresponding HARQ process to have been not toggled;
  else:
    consider the NDI bit for the corresponding HARQ process to have been toggled;
  deliver the configured uplink grant, and the associated HARQ information to the HARQ entity for this TTI.
NOTE: The period of configured uplink grants is expressed in TTIs.
NOTE: If the MAC entity receives both a grant in a Random Access Response and a grant for its C-RNTI or Semi persistent scheduling C-RNTI enabling transmissions on the SpCell in the same UL subframe, the MAC entity may choose to continue with either the grant for its RA-RNTI or the grant for its C-RNTI or Semi persistent scheduling C-RNTI.
NOTE: When a configured uplink grant is indicated during a measurement gap and indicates an UL-SCH transmission during a measurement gap, the MAC entity processes the grant but does not transmit on UL-SCH.
Description 4 can include:
5.4.1 UL Grant reception
In order to transmit on the UL-SCH the MAC entity has a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers. If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
if an uplink grant for this TTI and this Serving Cell has been received on the PDCCH for the MAC entity's C-RNTI or Temporary C-RNTI; or
if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
    consider the NDI to have been toggled for the corresponding HARQ process regardless of the value of the NDI.
  deliver the uplink grant and the associated HARQ information to the HARQ entity for this TTI.
else, if this Serving Cell is the SpCell and if an uplink grant for this TTI has been received for the SpCell on the PDCCH of the SpCell for the MAC entity's Semi-Persistent Scheduling C-RNTI:
  if the NDI in the received HARQ information is 1:
    consider the NDI for the corresponding HARQ process not to have been toggled;
    deliver the uplink grant and the associated HARQ information to the HARQ entity for this TTI.
  else if the NDI in the received HARQ information is 0:
    if PDCCH contents indicate SPS release:
      clear the configured uplink grant (if any).
    else:
      store the uplink grant and the associated HARQ information as configured uplink grant;
      initialise (if not active) or re-initialise (if already active) the configured uplink grant to start in this TTI and to recur according to rules in subclause 5.10.2;
      consider the NDI bit for the corresponding HARQ process to have been toggled;
      deliver the configured uplink grant and the associated HARQ information to the HARQ entity for this TTI.
else, if this Serving Cell is the SpCell and an uplink grant for this TTI has been configured for the SpCell:
  if an UL buffer at the UE has data available for transmission (i.e., UL buffer is not empty):
    consider the NDI bit for the corresponding HARQ process to have been not toggled;
  else:
    consider the NDI bit for the corresponding HARQ process to have been toggled;
  deliver the configured uplink grant, and the associated HARQ information to the HARQ entity for this TTI.
NOTE: The period of configured uplink grants is expressed in TTIs.
NOTE: If the MAC entity receives both a grant in a Random Access Response and a grant for its C-RNTI or Semi persistent scheduling C-RNTI enabling transmissions on the SpCell in the same UL subframe, the MAC entity may choose to continue with either the grant for its RA-RNTI or the grant for its C-RNTI or Semi persistent scheduling C-RNTI.

NOTE: When a configured uplink grant is indicated during a measurement gap and indicates an UL-SCH transmission during a measurement gap, the MAC entity processes the grant but does not transmit on UL-SCH.

Description 5 can include:

5.4.1 UL Grant reception

In order to transmit on the UL-SCH the MAC entity has a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers. If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:

if an uplink grant for this TTI and this Serving Cell has been received on the PDCCH for the MAC entity's C-RNTI or Temporary C-RNTI; or if an uplink grant for this TTI has been received in a Random Access Response:

if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:

consider the NDI to have been toggled for the corresponding HARQ process regardless of the value of the NDI.

deliver the uplink grant and the associated HARQ information to the HARQ entity for this TTI.

else, if this Serving Cell is the SpCell and if an uplink grant for this TTI has been received for the SpCell on the PDCCH of the SpCell for the MAC entity's Semi-Persistent Scheduling C-RNTI:

if the NDI in the received HARQ information is 1:

consider the NDI for the corresponding HARQ process not to have been toggled;

deliver the uplink grant and the associated HARQ information to the HARQ entity for this TTI.

else if the NDI in the received HARQ information is 0:

if PDCCH contents indicate SPS release:

clear the configured uplink grant (if any).

else:

store the uplink grant and the associated HARQ information as configured uplink grant;

initialise (if not active) or re-initialise (if already active) the configured uplink grant to start in this TTI and to recur according to rules in subclause 5.10.2;

consider the NDI bit for the corresponding HARQ process to have been toggled;

deliver the configured uplink grant and the associated HARQ information to the HARQ entity for this TTI.

else, if this Serving Cell is the SpCell and an uplink grant for this TTI has been configured for the SpCell:

if non-adaptive retransmissions on prescheded grant is configured and the value is set to TRUE:

consider the NDI bit for the corresponding HARQ process to have been not toggled;

else:

consider the NDI bit for the corresponding HARQ process to have been toggled;

deliver the configured uplink grant, and the associated HARQ information to the HARQ entity for this TTI.

NOTE: The period of configured uplink grants is expressed in TTIs.

NOTE: If the MAC entity receives both a grant in a Random Access Response and a grant for its C-RNTI or Semi persistent scheduling C-RNTI enabling transmissions on the SpCell in the same UL subframe, the MAC entity may choose to continue with either the grant for its RA-RNTI or the grant for its C-RNTI or Semi persistent scheduling C-RNTI.

NOTE: When a configured uplink grant is indicated during a measurement gap and indicates an UL-SCH transmission during a measurement gap, the MAC entity processes the grant but does not transmit on UL-SCH.

Additional description 6 can include:

For each TTI, the HARQ entity shall:

identify the HARQ process(es) associated with this TTI, and for each identified HARQ process:

if an uplink grant has been indicated for this process and this TTI:

if the received grant was not addressed to a Temporary C-RNTI on PDCCH and if the NDI provided in the associated HARQ information has been toggled compared to the value in the previous transmission of this HARQ process; or if the uplink grant was received on PDCCH for the C-RNTI and the HARQ buffer of the identified process is empty; or if the uplink grant was received in a Random Access Response:

if there is a MAC PDU in the Msg3 buffer and the uplink grant was received in a Random Access Response:

obtain the MAC PDU to transmit from the Msg3 buffer.

else if the MAC entity is configured with semi-PersistSchedIntervalUL shorter than 10 subframes and if the uplink grant is a configured grant, and if the HARQ buffer of the identified HARQ process is not empty, and if HARQ_FEEDBACK of the identified HARQ process is NACK:

instruct the identified HARQ process to generate a non-adaptive retransmission.

else:

obtain the MAC PDU to transmit from the "Multiplexing and assembly" entity, if any;

if a MAC PDU to transmit has been obtained:

deliver the MAC PDU and the uplink grant and the HARQ information to the identified HARQ process;

instruct the identified HARQ process to trigger a new transmission.

else:

deliver the uplink grant and the HARQ information (redundancy version) to the identified HARQ process;

instruct the identified HARQ process to generate an adaptive retransmission.

else, if the HARQ buffer of this HARQ process is not empty:
   instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

Additional description 7 can include:
1. 5.10.2 Uplink

After a Semi-Persistent Scheduling uplink grant is configured, the MAC entity shall:
   if twoIntervalsConfig is enabled by upper layer:
      set the Subframe Offset according to Table 7.4-1.
   else:
      set Subframe_Offset to 0.
   consider sequentially that the $N^{th}$ grant occurs in the subframe for which:

$$-(10*SFN+\text{subframe})=[(10*SFN_{start\ time}+\text{subframe}_{start\ time})N*\text{semiPersistSchedIntervalUL}+\text{Subframe\_Offset}*(N \text{ modulo } 2)] \text{modulo } 10240.$$

Where $SFN_{start\ time}$ and $\text{subframe}_{start\ time}$ are the SFN and subframe, respectively, at the time the configured uplink grant were (re-)initialised.

For TDD, the MAC entity is configured with semiPersistSchedIntervalUL shorter than 10 subframes, the $N^{th}$ grant shall be ignored if it occurs in a downlink subframe or a special subframe.

If the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

If SPS confirmation has been triggered and not cancelled:
   if the MAC entity has UL resources allocated for new transmission for this TTI:
      instruct the Multiplexing and Assembly procedure to generate an SPS confirmation MAC Control Element as defined in subclause 6.1.3.xx;
      cancel the triggered SPS confirmation.

The MAC entity shall clear the configured uplink grant immediately after first transmission of SPS confirmation MAC Control Element triggered by the SPS release.

NOTE: Retransmissions for Semi-Persistent Scheduling can continue after clearing the configured uplink grant.

For BL UEs or UEs in enhanced coverage $SFN_{start\ time}$ and $\text{subframe}_{start\ time}$ refer to SFN and subframe of the first transmission of PUSCH where configured uplink grant was (re-) initialized.

Addition description 8 can include a description of a SPS-Config information element field:
semiPersistSchedIntervalUL Semi-persistent scheduling interval in uplink. Value in number of sub-frames. Value sf10 corresponds to 10 sub-frames, sf20 corresponds to 20 sub-frames and so on. For TDD, when the configured Semi-persistent scheduling interval is greater than or equal to 10 sub-frames, the UE shall round this parameter down to the nearest integer (of 10 sub-frames), e.g. sf10 corresponds to 10 sub-frames, sf32 corresponds to 30 sub-frames, sf128 corresponds to 120 sub-frames.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A user equipment (UE), comprising:
storage comprising instructions;
one or more baseband processing units configured to execute the instructions to:
   decode a radio resource control (RRC) message, received from a radio access network (RAN) node, including a semi-persistent scheduling (SPS) configuration with an SPS uplink (UL) interval;
   store data in a hybrid automatic repeat request (HARQ) buffer associated with a HARQ process for transmission to the RAN node, the data associated with the HARQ process;
   determine that the SPS UL interval is less than a threshold number of subframes, the HARQ buffer associated with the HARQ process is not empty, and a HARQ feedback, received from the RAN node, associated with the HARQ process includes a negative acknowledgement (NACK); and
   generate and transmit a non-adaptive re-transmission of the data to the RAN node on a configured UL grant using the SPS UL interval, the configured UL grant configured by the RAN node.

2. The UE of claim 1, wherein the threshold number of subframes is 10 subframes.

3. The UE of claim 1, wherein the configured UL grant is an SPS resource.

4. The UE of claim 1, wherein the SPS configuration further includes a configuration to skip a UL transmission for the configured UL grant if no data is available for transmission in a UL buffer.

5. The UE of claim 1, wherein the SPS configuration further comprises an SPS-Config information element.

6. The UE of claim 1, wherein one subframe is a transmission time interval (TTI).

7. The UE of claim 1, wherein a transmission time interval (TTI) comprises one or more subframes and the threshold number of subframes is 10 TTIs.

8. The UE of claim 1, wherein the non-adaptive re-transmission is a non-adaptive hybrid automatic repeat request (HARM) re-transmission.

9. The UE of claim 1, wherein the configured UL grant is an SPS resource on the UL shared channel.

10. The UE of claim 1, wherein the non-adaptive re-transmission is performed on a same resource and with a same modulation and coding scheme (MCS) as was used for a last made transmission attempt.

11. The UE of claim 1, wherein the RAN node is a fifth generation enhanced node B (5G eNB).

12. A radio access network (RAN) node comprising:
storage comprising instructions;
one or more baseband processing units configured to execute the instructions to:
   encode and transmit a radio resource control (RRC) message to a user equipment (UE) including a semi-persistent scheduling (SPS) configuration with an SPS uplink (UL) interval that is less than a threshold number of subframes;
   encode and transmit a hybrid automatic repeat request (HARQ) feedback to the UE for a HARQ process that includes a negative acknowledgement (NACK);
   receive a non-adaptive re-transmission of data, from the UE, on a configured UL grant using the SPS UL interval, when it is determined that the SPS UL interval is less than the threshold number of subframes, a HARQ buffer associated with the HARQ process is not empty, and the HARQ feedback associated with the HARQ process includes the NACK; and
   decode the configured UL grant configured by the RAN node.

13. The RAN node of claim 12, wherein the one or more baseband processing units are further configured to:
   process a transmission of the data using a modulation and coding scheme (MCS); and
   use the MCS to process the non-adaptive re-transmission of the data.

14. The RAN node of claim 12, wherein the threshold number of subframes is 10 subframes.

15. The RAN node of claim 12, wherein the configured UL grant is an SPS resource.

16. The RAN node of claim 12, wherein the SPS configuration further includes a configuration to skip a UL transmission for the configured UL grant if no data is available for transmission in a UL buffer.

17. The RAN node of claim 12, wherein the SPS configuration further comprises an SPS-Config information element.

18. The RAN node of claim 12, wherein to process a non-adaptive re-transmission on the configured UL grant further comprises to generate an indicator of the non-adaptive re-transmission on the configured UL grant to the RAN Node.

19. The RAN node of claim 12, wherein the RAN node is an enhanced Node B (eNB).

* * * * *